(No Model.)
W. G. ADAMS.
DEVICE FOR CONVERTING RECIPROCATING INTO ROTARY MOTION.
No. 336,978. Patented Mar. 2, 1886.
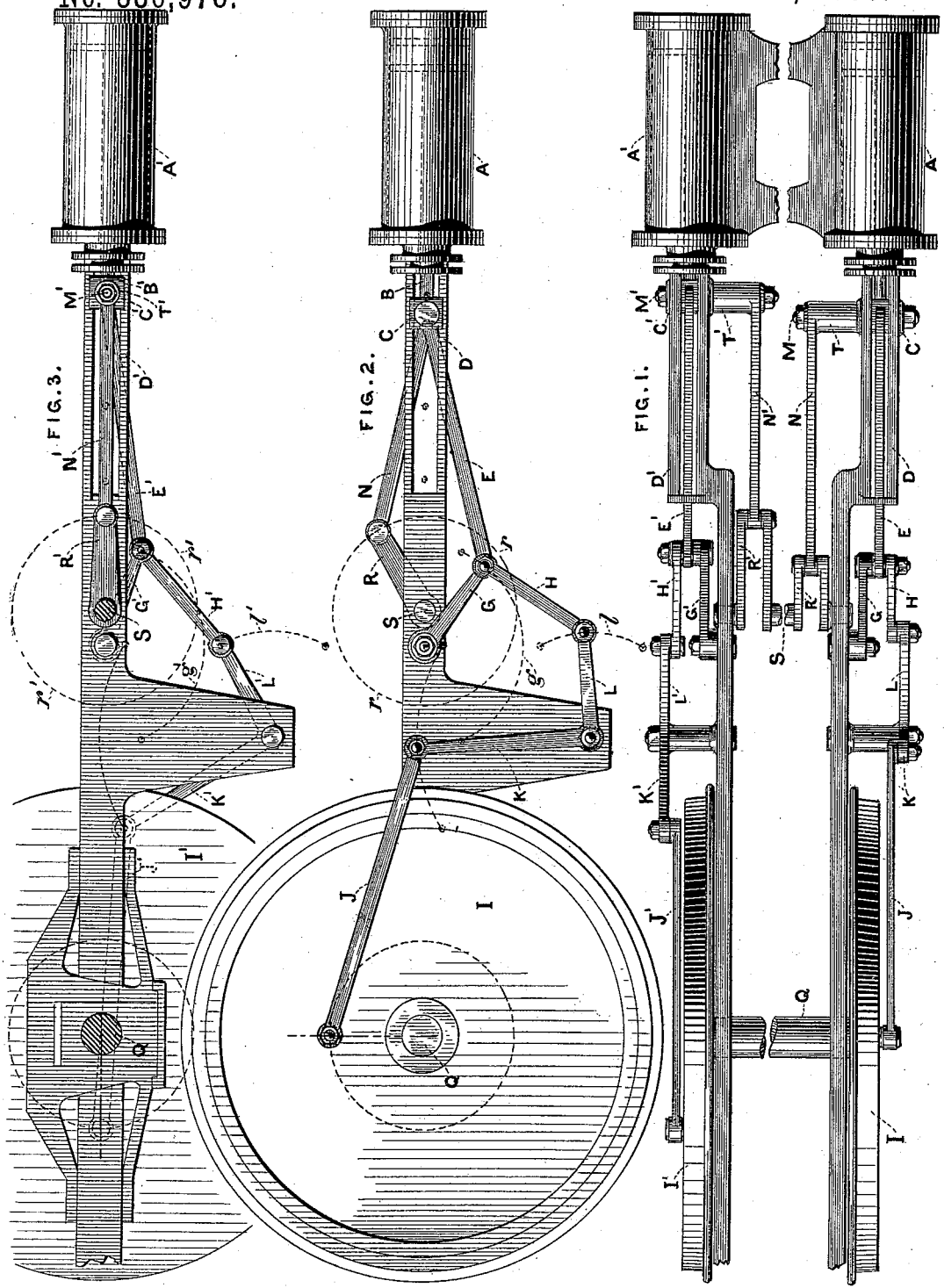
WITNESSES:
Forrest W. West
Henry M. Paul Jr.
INVENTOR:
Wm. G. Adams,
By Hollingsworth & Fraley
Attorneys.

UNITED STATES PATENT OFFICE.

WILLIAM GEORGE ADAMS, OF PHILADELPHIA, PENNSYLVANIA.

DEVICE FOR CONVERTING RECIPROCATING INTO ROTARY MOTION.

SPECIFICATION forming part of Letters Patent No. 336,978, dated March 2, 1886.

Application filed January 2, 1886. Serial No. 187,382. (No model.)

*To all whom it may concern:*

Be it known that I, WILLIAM GEORGE ADAMS, of Philadelphia, in the State of Pennsylvania, have invented certain new and useful Improvements in 'Duplicating - Engines, whereof the following is a specification, reference being had to the accompanying drawings.

In said drawings, Figure 1 represents a top or plan view of my improved engine, the two sides of the machine being approached, as indicated by the broken line, in order to show it more clearly within a limited space. Fig. 2 is a view in elevation of the exterior of that side of the machine which in Fig. 1 is nearest the bottom of the sheet, and Fig. 3 is a view in elevation of the interior of that side of the machine which in Fig. 1 is farthest from the bottom of the machine.

The position of the moving parts as shown in all three figures is the actual one which they assume at the moment when the stroke of the piston in Fig. 3 is commencing.

My invention belongs to that class of engines wherein one complete reciprocation backward and forward of the driving-piston causes two complete revolutions of a rotating shaft, fly-wheel, or other similar movable part, and in the instance illustrated by the drawings the invention is shown as applied to the driving-wheels of a locomotive-engine.

The difficulties which have heretofore prevented this class of engines from practical application to any extent arise from the constant occurrence of dead-points in the positions of the driving parts. This fact renders the embodiment of the principle in a single-acting engine impossible, and even when arranged as a double engine, with one piston in advance of the other, there is a practical difficulty which cannot be overcome, although in theory the engine may be correct.

So long as the positive driving action takes place from the piston the coupling together of those parts wherein the motion has been, so to speak, duplicated, may suffice to carry the duplicating devices past dead-points; but as soon as the positive driving of the piston has ceased—as, for instance, when, in a locomotive-engine, steam is shut off and the momentum of the apparatus causes the drivers to still rotate—dead-points at once occur which are of such a nature that one portion of the machinery will be reversed and break. I believe that the reason of this practical difficulty lies in the fact that when steam has been shut off the engine, though double in structure, really becomes for practical purposes a pair of single-acting engines, each driven from the fly-wheel or rotating shaft, instead of from the normal driving end of the apparatus, and when one of these engines has reached a dead-point in that portion of the apparatus where normal or duplication of the movement takes place the mechanism is almost certain to be reversed. Therefore, so far from being aided by its connection with the other half of the engine (which cannot reverse simultaneously therewith) the connections must break at some point.

To obviate these difficulties is the purpose of my invention, and I accomplish it by not only providing a coupling which connects those parts where the movement has been duplicated, but also by providing a second coupling, which unites those parts of the apparatus wherein no duplication of the movement takes place. This second coupling not only aids in the normal driving of the machine to some extent, but when the positive driving of the piston has ceased and the apparatus is running from momentum alone overcomes all the dead-points before referred to, and obviates any tendency on the part of one side of the machine to reverse relatively to the other.

As before stated, in the drawings I have shown an apparatus as applied to the driver of a locomotive engine, and I have also shown a form of a duplicating device which I deem best adapted for the purpose; but I do not desire to limit my claim hereinafter made to such application, nor to the particular form of duplicating member shown, since such form may be varied by mechanical skill without affecting the applicability of my improvements.

In said drawings, A A' represent the pair of driving-cylinders having pistons and rods B B'.

As the parts throughout are complete duplicates of one or the other, only one half of the engine will be described, the corresponding parts of the other half being indicated by similar letters with a prime-mark (').

To the piston-rod B is attached a cross head, C, moving in guides D. To this cross-head is attached a bar, E, which is pivoted to a swinging arm, G, mounted upon the frame. This swinging arm G is what may be called the "duplicating" member of the apparatus.

To the end of the swinging arm G is attached a pivoted link, H, which in turn is connected with the short arm L of a bell-crank lever mounted upon the housing. The long arm K of this lever is attached to a connecting-rod, J, which leads to a crank-pin upon the driving-wheel I, upon whose axle Q is mounted a second driving-wheel, I', driven by a similar system of apparatus to that just described. This second system is shown in Fig. 3 as seen from the interior. One engine should have a lead of the other equal to a quarter-center upon the driving-wheel. The engines are thus coupled through the driving-wheel shaft throughout those portions where the movement is duplicated.

The second coupling, which unites those portions where the movement is not duplicated, consists of two cranks, R R', (see Fig. 1,) united by a common shaft, S, and connected, preferably, with the respective cross-heads. In the construction shown this connection is effected by mounting upon a wrist-pin, M, attached to the cross-head C an elongated bearing, T, from whence a connecting-rod, N, leads to the crank R. A similar device is applied to the other engine, as indicated by the corresponding "'" letters.

Although for compactness of illustration the shafts Q and S are shown in Fig. 1 as broken, it must be understood that they are continuous.

The shaft S affords a convenient means for actuating the valve-movement, which may be of any form, and which, being well known, it is not thought necessary to describe or show.

The operation of the device is as follows: The piston B' of the cylinder A' is represented as about to commence its stroke. On its forward movement the bar E' causes the swinging arm G' to oscillate throughout the arc indicated by the dotted lines at $g'$. This oscillation causes a downward and upward movement of the link H', and hence a similar reciprocation of the bell-crank lever L', through the arc indicated by the dotted lines at $l'$. The backward and forward movement of the bell-crank lever causes, by means of the connecting-rod G, a complete revolution of the driving-wheel I. A similar movement has of course taken place in the other engine, which completes its stroke very shortly after the commencement of the stroke of the first engine, since, by reason of the duplicating devices, the lead of the piston is substantially one-half of the lead of the drivers, there being a slight variation from the exact proportion by reason of the want of complete uniformity throughout the relative movements of a driving-crank, as is well understood. During this action of the machine the cranks R and R' have been making their respective revolutions in the circle $r\ r'$, and, as before stated, have aided in the coupling of the engines during the positive driving. As soon as the steam is cut off from the cylinders, and the momentum of the apparatus alone continues its motion, the coupling through the shaft S becomes the only efficient coupling between the two engines, and transmits the motion backward from each driver to those parts of the machine, which may, for purpose of convenience, be described as being upon the cylinder side of the duplicating member. The stoppage or reversal of any of these parts is thus prevented by the positive action of the second coupling, and the machine is made practically operative under all the necessary conditions of use.

As before stated, the duplicating member of the engine may be varied in construction by the substitution of any known mechanical means which shall effect the same purpose, and so, also, the form and position of the second coupling may be varied without affecting its relation to the remaining parts of the apparatus. While, therefore, I disclaim, broadly, the idea of duplicating the movement of a piston upon a driving-wheel as being old, I do not limit myself to the identical members hereinbefore specified, provided combined action necessary exists, and in using the words "duplicating member" in my claim I desire to include any device or group of devices which may effect a similar purpose.

Having thus described my invention, I claim—

In a duplicating-engine, the combination, with a pair of cylinders and pistons having suitable duplicating members and devices driven thereby, of a coupling which connects those portions of the machine wherein the motion has been duplicated, and a second coupling which connects those portions of the machine which are between the cylinders and the duplicating member, the whole operating substantially in the manner set forth.

WILLIAM GEORGE ADAMS.

Witnesses:
FORREST W. WEST,
HENRY N. PAUL, Jr.